US009423719B1

(12) United States Patent
Mizutani

(10) Patent No.: US 9,423,719 B1
(45) Date of Patent: Aug. 23, 2016

(54) OPTICAL SCANNING DEVICE AND IMAGE FORMING APPARATUS USING THE SAME

(71) Applicant: KYOCERA Document Solutions Inc., Osaka-shi, Osaka (JP)

(72) Inventor: Hideji Mizutani, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 15/008,795

(22) Filed: Jan. 28, 2016

(30) Foreign Application Priority Data

Jan. 30, 2015 (JP) ................................ 2015-016337

(51) Int. Cl.
*G03G 15/04* (2006.01)
*G03G 15/041* (2006.01)
*H04N 1/06* (2006.01)
*H04N 1/028* (2006.01)

(52) U.S. Cl.
CPC ........ *G03G 15/0415* (2013.01); *H04N 1/0283* (2013.01); *H04N 1/06* (2013.01)

(58) Field of Classification Search
CPC ................... G03G 15/04072; G03G 15/0415; G03G 15/00177; G03G 2215/00202; H04N 1/0283

See application file for complete search history.

(56) References Cited

U.S. PATENT DOCUMENTS

| 5,592,337 | A | * | 1/1997 | Hama | .................... | G02B 7/182 |
| | | | | | | 359/216.1 |
| 7,230,638 | B2 | * | 6/2007 | Fukutomi | .......... | G03G 15/0194 |
| | | | | | | 347/243 |
| 7,522,326 | B1 | | 4/2009 | Otoguro | | |
| 2008/0094678 | A1 | * | 4/2008 | Uduki | ..................... | B41J 2/473 |
| | | | | | | 359/204.1 |
| 2009/0231657 | A1 | | 9/2009 | Otoguro | | |
| 2013/0194370 | A1 | * | 8/2013 | Sakaue | ................ | G02B 26/123 |
| | | | | | | 347/118 |

FOREIGN PATENT DOCUMENTS

JP 2009098447 A 5/2009

\* cited by examiner

*Primary Examiner* — Clayton E LaBalle
*Assistant Examiner* — Victor Verbitsky
(74) *Attorney, Agent, or Firm* — Alleman Hall McCoy Russell & Tuttle LLP

(57) ABSTRACT

An optical scanning device includes a light source portion, a deflector, a first focus lens, a second focus lens, a first mirror group, and a second mirror group. The first mirror group includes: a first reflection mirror on which a first light beam having transmitted through a first focus lens is incident, the first reflection mirror reflecting the first light beam in a second direction away from a first scanned surface; and a second reflection mirror that reflects the reflected first light beam toward the first scanned surface. The second mirror group includes: a third reflection mirror on which a second light beam having transmitted through a second focus lens is incident, the third reflection mirror reflecting the second light beam in the first direction of approaching the second scanned surface; and a fourth reflection mirror that reflects the reflected second light beam toward the second scanned surface.

8 Claims, 3 Drawing Sheets

OPTICAL SCANNING DEVICE AND IMAGE FORMING APPARATUS USING THE SAME

INCORPORATION BY REFERENCE

This application is based upon and claims the benefit of priority from the corresponding Japanese Patent Application No. 2015-016337 filed on Jan. 30, 2015, the entire contents of which are incorporated herein by reference.

BACKGROUND

The present disclosure relates to an optical scanning device that includes a plurality of light sources for emitting light beams and a deflector for reflecting the light beams toward corresponding scanned surfaces, and to an image forming apparatus that uses the optical scanning device.

An optical scanning device for use in a color laser printer includes, for example: a plurality of light sources for emitting laser beams respectively for colors of cyan, magenta, yellow and black; a deflector (polygon mirror) for deflecting the laser beams such that the laser beams scan the circumferential surfaces (scanned surfaces) of the photoconductor drums for respective colors; and focus lenses for focusing the deflected laser beams on the circumferential surfaces. The deflector may be used in common by a plurality of laser beams.

There has been disclosed a technology in which two optical scanning devices are used to scan four photoconductor drums disposed adjacent to each other. Each of the optical scanning devices includes two light sources and a deflector. In this case, a laser beam emitted from a light source is deflected at a first position on the circumference of the deflector, a laser beam emitted from the other light source is deflected at a second position that is on the opposite side to the first position.

SUMMARY

An optical scanning device according to an aspect of the present disclosure includes a housing, a light source portion, a deflector, a first focus lens, a second focus lens, a first mirror group, and a second mirror group. The light source portion includes a first light source and a second light source, the first light source emitting a first light beam, the second light source emitting a second light beam. The rotation axis of the deflector is inclined with respect to a first direction and a second direction, the first direction being opposite to the second direction. The deflector is configured to reflect the first light beam diagonally on a side of a third direction that is perpendicular to the first direction and the second direction, and on a side of the first direction, and is configured to reflect the second light beam diagonally on a side of a fourth direction that is opposite to the third direction, and on a side of the second direction, such that the first light beam scans a first scanned surface and the second light beam scans a second scanned surface. The first focus lens is disposed between the deflector and the first scanned surface and configured to focus the first light beam on the first scanned surface. The second focus lens is disposed between the deflector and the second scanned surface and configured to focus the second light beam on the second scanned surface. The first mirror group is disposed between the first focus lens and the first scanned surface and configured to reflect the first light beam to the first scanned surface. The second mirror group is disposed between the second focus lens and the second scanned surface and configured to reflect the second light beam to the second scanned surface. The first mirror group includes a first reflection mirror and a second reflection mirror. The first light beam that has transmitted through the first focus lens is incident on the first reflection mirror. The first reflection mirror is configured to reflect the first light beam in the second direction of separating away from the first scanned surface. The second reflection mirror is configured to reflect the first light beam reflected by the first reflection mirror, toward the first scanned surface. The second mirror group includes a third reflection mirror and a fourth reflection mirror. The second light beam that has transmitted through the second focus lens is incident on the third reflection mirror. The third reflection mirror is configured to reflect the second light beam in the first direction of approaching the second scanned surface. The fourth reflection mirror is configured to reflect the second light beam reflected by the third reflection mirror, toward the second scanned surface.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
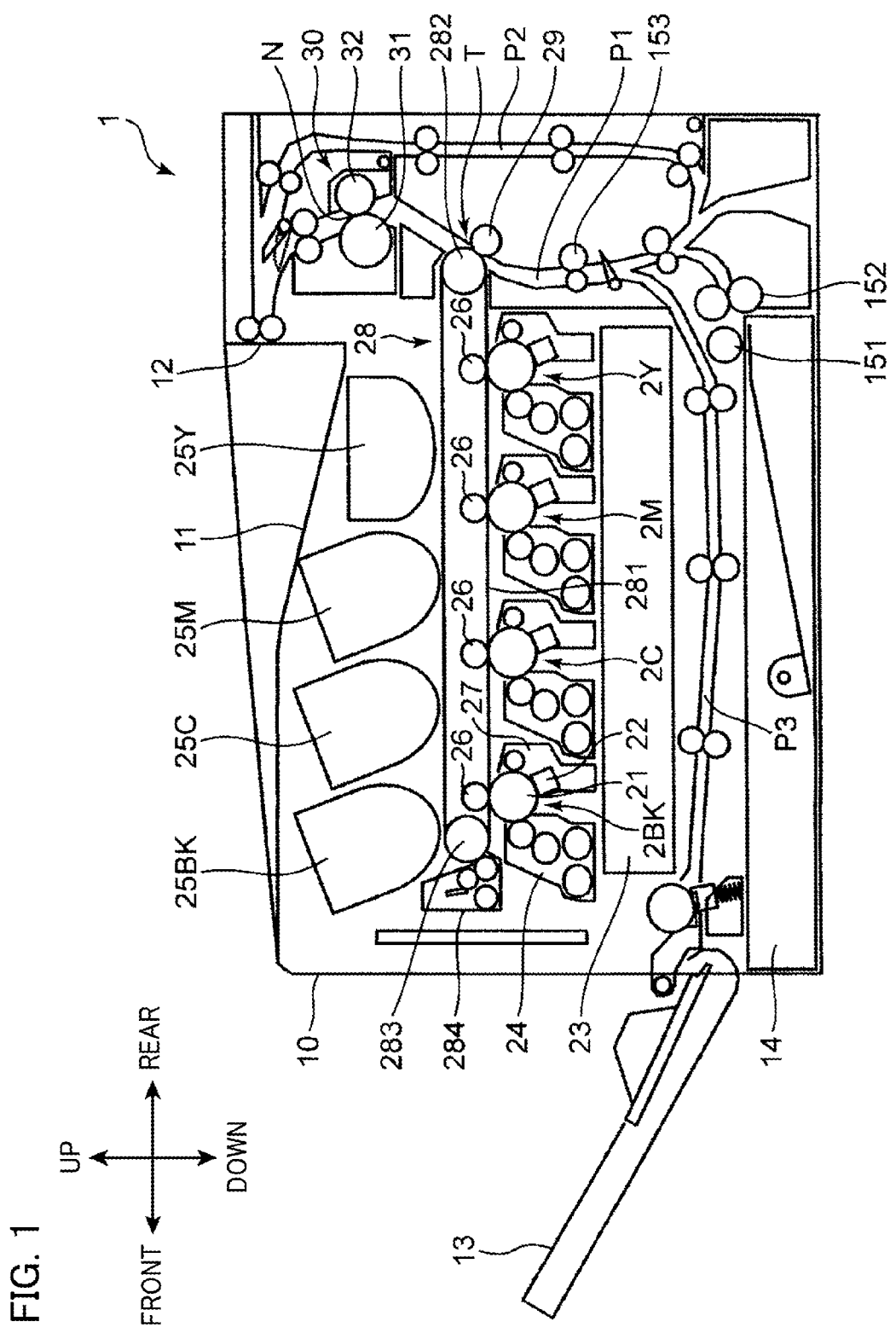
FIG. 1 is a cross-sectional view showing the configuration of a color printer according to an embodiment of the present disclosure.

The following describes an embodiment of the present disclosure with reference to the drawings. FIG. 1 is a cross-sectional view showing the configuration of the image forming apparatus 1 according to an embodiment of the present disclosure. The image forming apparatus 1 is a tandem color printer. The image forming apparatus 1 includes a main body housing 10 that is formed approximately in the shape of a rectangular parallelepiped. It is noted that the image forming apparatus may be a full-color copier or multifunction peripheral.

The main body housing 10 includes therein a plurality of processing units for performing an image formation process to a sheet. In the present embodiment, the main body housing 10 includes, as the processing units, image forming units 2Y, 2C, 2M and 2Bk, color containers 25Y, 25C, 25M and 25Bk for respective colors, an optical scanning device 23, an intermediate transfer unit 28, and a fixing device 30. A sheet discharge tray 11 is provided on the upper surface of the main body housing 10. A sheet discharge port 12 is opened opposite to the sheet discharge tray 11. A manual feed tray 13 is attached to a side wall of the main body housing 10 in a freely openable/closable manner. A sheet feed cassette 14 is attached to a lower part of the main body housing 10 in a freely attachable/detachable manner, wherein sheets on which images are to be formed by the image formation process are stored in the sheet feed cassette 14.

The image forming units 2Y, 2C, 2M and 2Bk are configured to form toner images of yellow, cyan, magenta and black respectively based on image information transmitted from an external apparatus such as a computer, and are aligned at predetermined intervals in tandem in the horizontal direction. Each of the image forming units 2Y, 2C, 2M and 2Bk includes: a cylindrical photoconductor drum 21 for carrying an electrostatic latent image and a toner image; a charger 22; a developing device 24; a primary transfer roller 26; and a cleaning device 27.

The optical scanning device 23 forms electrostatic latent images on the circumferential surfaces of the photoconductor drums 21 of respective colors. The optical scanning device 23 of the present embodiment includes a plurality of light sources and focusing optical systems, wherein the plurality of light sources are prepared for the respective colors, and the focusing optical systems focus and scan the light beams emitted from the light sources on the circumferential surfaces of the photoconductor drums 21 of the respective colors. The focusing optical systems are not independent optical systems, but a part thereof is used in common. The optical scanning device 23 is described below.

The intermediate transfer unit 28 performs a primary transfer of transferring toner images formed on the photoconductor drums 21. The intermediate transfer unit 28 includes a transfer belt 281, a driving roller 282 and a driven roller 283, wherein the transfer belt 281 circumferentially rotates while contacting the circumferential surfaces of the photoconductor drums 21, and the transfer belt 281 is suspended between the driving roller 282 and the driven roller 283. The transfer belt 281 is pressed against the circumferential surfaces of the photoconductor drums 21 by the primary transfer rollers 26. In the primary transfer, the toner images are transferred from the photoconductor drums 21 so as to be overlaid at a same position on the transfer belt 281. This allows a full-color toner image to be formed on the transfer belt 281.

A secondary transfer roller 29 is disposed opposite to the driving roller 282 across the transfer belt 281 so as to form a secondary transfer nip portion T. In the secondary transfer, the full-color toner image is transferred from the transfer belt 281 to a sheet by the secondary transfer nip portion T. Toner that has remained on the circumferential surface of the transfer belt 281 without being transferred to the sheet, is collected by a belt cleaning device 284 disposed opposite to the driven roller 283.

The fixing device 30 includes a fixing roller 31 and a pressure roller 32, wherein a heat source is embedded in the fixing roller 31, and the fixing roller 31 and the pressure roller 32 form a fixing nip portion N. The fixing device 30 performs a fixing process in which the sheet to which the toner image has been transferred by the secondary transfer nip portion T is heated and pressed by the fixing nip portion N so that the toner is fused and fixed to the sheet. The sheet subjected to the fixing process is discharged from the sheet discharge port 12 toward the sheet discharge tray 11.

A sheet conveyance path for conveying sheets is provided in the main body housing 10. The sheet conveyance path includes a main conveyance path P1 that vertically extends from near a lower part of the main body housing 10 to near an upper part via the secondary transfer nip portion T and the fixing device 30. The downstream end of the main conveyance path P1 is connected to the sheet discharge port 12. A reverse conveyance path P2 for conveying a reversed sheet in the double-side printing is provided to extend from the most downstream end in the main conveyance path P1 to near the upstream end. In addition, a manually fed sheet conveyance path P3 extending from the manual feed tray 13 to the main conveyance path P1 is disposed above the sheet feed cassette 14.

The sheet feed cassette 14 includes a sheet storage portion for storing a stack of sheets. A pick-up roller 151 and a pair of sheet feed rollers 152 are disposed in the vicinity of an upper-right part of the sheet feed cassette 14, wherein the pick-up roller 151 picks up, one by one, the top sheets of the stack of sheets, and the pair of sheet feed rollers 152 feed the picked-up sheet toward the upstream end of the main conveyance path P1. A sheet placed on the manual feed tray 13 is also conveyed to the upstream end of the main conveyance path P1 via the manually fed sheet conveyance path P3. A pair of registration rollers 15 are disposed more on the upstream side than the secondary transfer nip portion T in the main conveyance path P1, wherein the pair of registration rollers 15 feed a sheet to the transfer nip portion at a predetermined timing.

When a single-side printing process (image formation process) is performed to a sheet, the sheet is fed from the sheet feed cassette 14 or the manual feed tray 13 to the main conveyance path P1. A transfer process of transferring a toner image to the sheet is performed in the secondary transfer nip portion T, and the fixing process of fixing the transferred toner to the sheet is performed in the fixing device 30. Subsequently, the sheet is discharged from the sheet discharge port 12 onto the sheet discharge tray 11. On the other hand, during a double-side printing process, the transfer process and the fixing process are performed to one surface of the sheet, then the sheet is partially projected outward on the sheet discharge tray 11 from the sheet discharge port 12. Subsequently, the sheet is switchback-conveyed to be returned to near the upstream end of the main conveyance path P1 via the reverse conveyance path P2. The transfer process and the fixing process are then performed to the other surface of the sheet, then the sheet is discharged on the sheet discharge tray 11 from the sheet discharge port 12.

Figure 2:
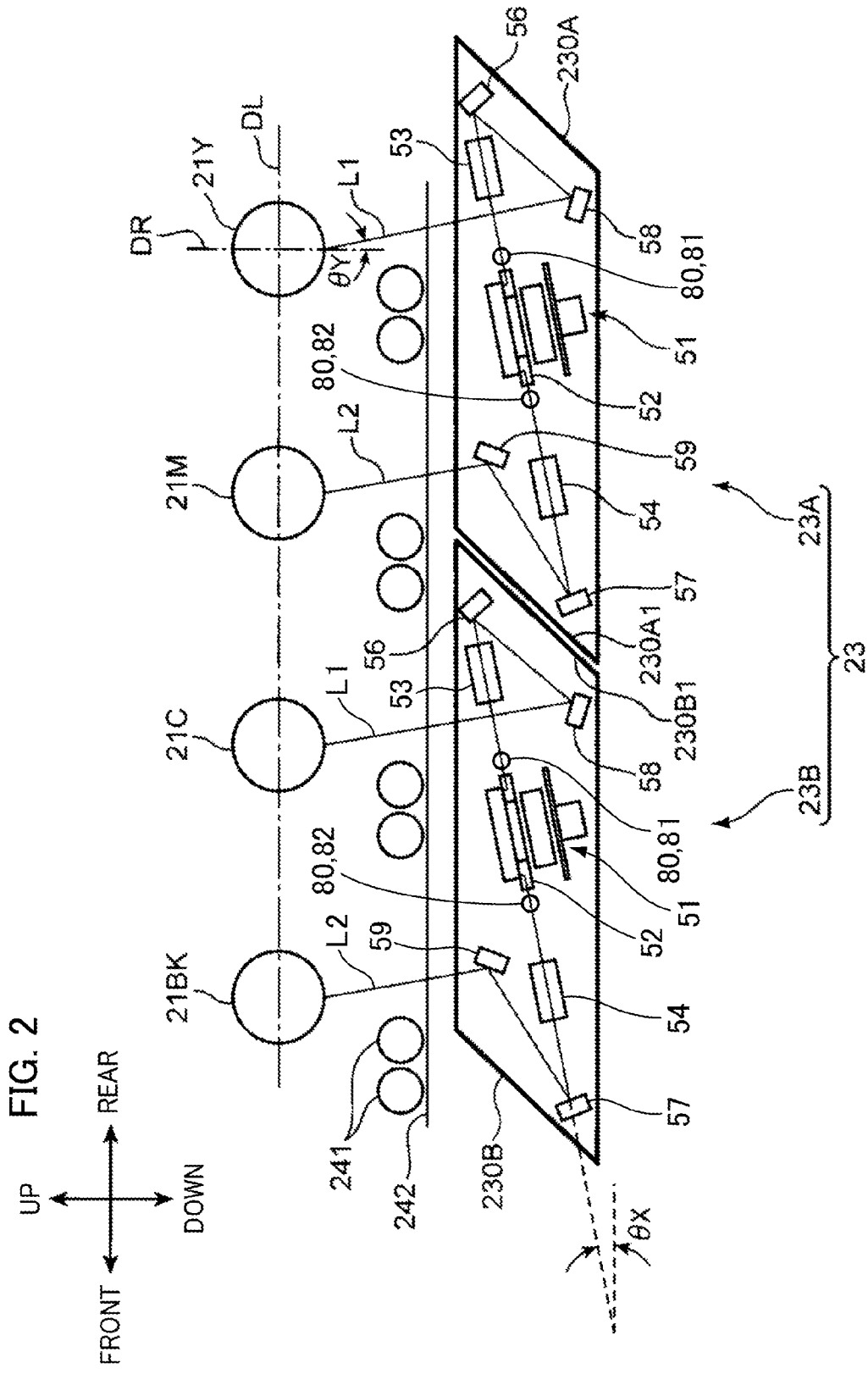
FIG. 2 is a cross-sectional view showing the internal configuration of an optical scanning device according to an embodiment of the present disclosure.
Figure 3:
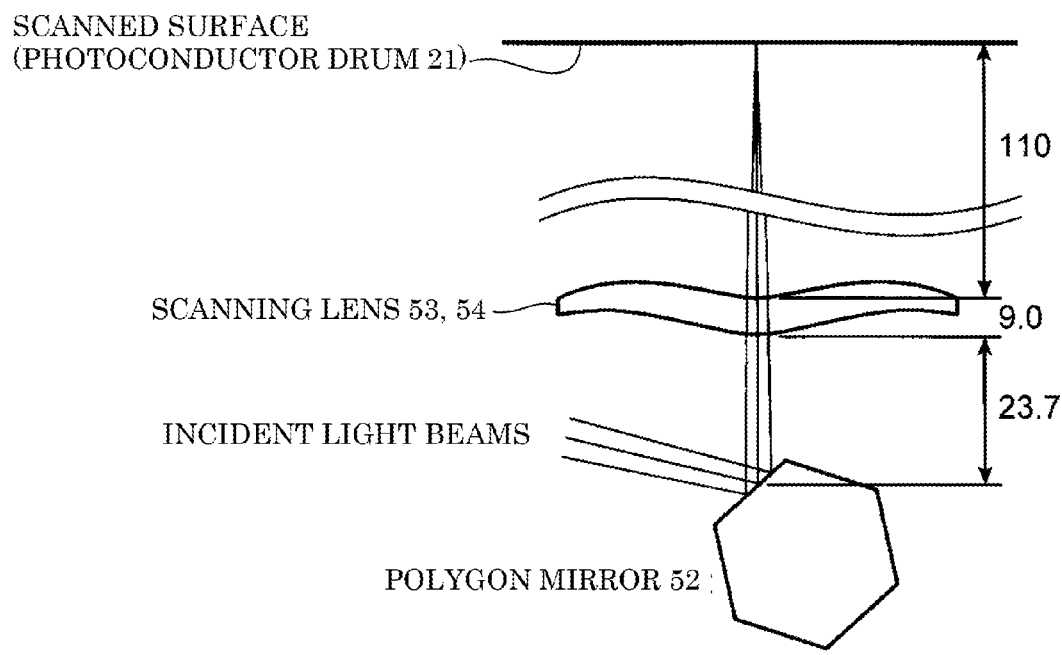
FIG. 3 is a plan view showing a part of an optical path of the optical scanning device according to an embodiment of the present disclosure.

The optical scanning device 23 of the present embodiment is further described. FIG. 2 is a cross-sectional view showing the internal configuration of the optical scanning device 23 of the present embodiment. FIG. 3 is a plan view showing a part of an optical path of the optical scanning device 23. The optical scanning device 23 includes a first optical scanning unit 23A and a second optical scanning unit 23B. The first optical scanning unit 23A and the second optical scanning unit 23B are disposed adjacent to each other in the horizontal direction. The first optical scanning unit 23A is disposed below a yellow photoconductor drum 21Y (the first scanned surface, the first photoconductor drum) and a magenta photoconductor drum 21M (the second scanned surface, the second photoconductor drum), and scans the circumferential surfaces of the two photoconductor drums 21. The second optical scanning unit 23B is disposed below a cyan photoconductor drum 21C (the first scanned surface, the third photoconductor drum) and a black photoconductor drum 21BK (the second scanned surface, the fourth photoconductor drum), and scans the circumferential surfaces of the two photoconductor drums 21.

It is noted that the main scanning direction of the first optical scanning unit 23A and the second optical scanning unit 23B is a left-right direction perpendicular to the plane of FIG. 2, and the sub scanning direction is a front-rear direction, namely a tangent direction at the lower-end part of each photoconductor drum 21. In addition, as shown in FIG.

2, the photoconductor drums 21 of four colors are disposed such that the rotation shaft centers are disposed adjacent to each other at intervals on a predetermined straight line (a first reference line DL) in a cross section taken along a plane including the sub scanning direction of the optical scanning device 23, and the photoconductor drums 21 are rotated by a driving portion (not shown). In addition, a second reference line DR is defined as a straight line that is perpendicular to the first reference line DL. In the present embodiment, the second reference line DR extends along the up-down direction. Furthermore, in FIG. 2, a pair of conveyance screws 241 and a developing housing lower end portion 242 of the developing device 24 are seen between: the photoconductor drums 21; and the first optical scanning unit 23A and the second optical scanning unit 23B. The pair of conveyance screws 241 have a function to stir the developer in the developing device 24. The developing housing lower end portion 242 is an imaginary straight line that extends along the lower end portion of the housing of the developing device 24.

Next, the internal configuration of the first optical scanning unit 23A is described. The first optical scanning unit 23A includes a first housing 230A, a light source unit 80 (the light source portion), a polygon motor 51, a polygon mirror 52 (deflector), and a focusing optical system, wherein the light source unit 80 includes light sources 81 and 82 respectively for yellow and magenta that are stored in the first housing 230A. It is noted that the second optical scanning unit 23B has the same internal configuration as the first optical scanning unit 23A, and includes a second housing 230B, a light source unit 80 (the light source portion), a polygon motor 51, a polygon mirror 52 (deflector), and a focusing optical system, wherein the light source unit 80 includes light sources 81 and 82 respectively for cyan and black that are stored in the second housing 230B. As a result, in the following, detailed description of the components of the second optical scanning unit 23B is omitted. In addition, in FIG. 2, components of the same type included in the first optical scanning unit 23A and the second optical scanning unit 23B are assigned a same reference number, for the sake of explanation.

The light sources 81 and 82 of the light source unit 80 stored in the first housing 230A each include a semiconductor laser that emits a laser beam of a single wavelength. A light source 81 for yellow (the first light source) is positioned more on the front side in the plane of the figure than the polygon mirror 52, and emits a first light beam L1 that is irradiated on the photoconductor drum 21Y. On the other hand, a light source 82 for magenta (the second light source) is disposed at a different position from the light source 81 for yellow in the sub scanning direction (front-rear direction), more specifically, is positioned more on the front side than the light source 81 for yellow. In addition, the light source 82 for magenta is positioned more on the rear side in the plane of the figure than the polygon mirror 52, and emits a second light beam L2 that is irradiated on the photoconductor drum 21M. In addition, a collemator lens (not shown), a cylindrical lens (not shown), and a diaphragm (not shown) are disposed respectively between the polygon mirror 52 and the light source 81, and between the polygon mirror 52 and the light source 82. The collemator lens converts a laser beam to parallel light beams, wherein the laser beam is emitted from the light source 81, 82 and diffused. The cylindrical lens converts the parallel light beams to line-like light beams that are elongated in the main scanning direction and focuses the light beams on the polygon mirror 52. The diaphragm regulates the laser beam emitted from the light source 81, 82.

The polygon mirror 52 deflects laser beams L1 and L2 (the first light beam and the second light beam) emitted from the light sources 81 and 82 for respective colors, respectively such that the light beams scan the circumferential surfaces of the photoconductor drums 21Y and 21M (the first scanned surface and the second scanned surface), from one end to the other end of a predetermined scanning range. The polygon mirror 52 is a polygon mirror having deflection surfaces formed along the sides of a hexagon. The rotation shaft of the polygon motor 51 is connected to the center of the polygon mirror 52. That is, the polygon motor 51 is coaxially fixed to the polygon mirror 52 and rotates the polygon mirror 52. The rotation shaft is inclined at an acute angle with respect to the up direction (the first direction) and the down direction (the second direction that is opposite to the first direction). In this way, in the present embodiment, a single polygon mirror 52 is used in common to scan the photoconductor drums 21 for two colors. As shown in FIG. 2, in a cross section taken along a plane including the sub scanning direction, the polygon mirror 52 deflects the first light beam L1 and the second light beam L2 in opposite directions. More specifically, the polygon mirror 52 reflects the first light beam L1 on the side of the rear direction (the third direction) perpendicular to the up-down direction, and in the diagonally upward direction (the rear diagonally upward direction). In addition, the polygon mirror 52 reflects the second light beam L2 on the side of the front direction (the fourth direction), which is opposite to the rear direction, and in the diagonally downward direction (the front diagonally downward direction).

The focusing optical system includes a scanning lens 53 (first focus lens), a scanning lens 54 (second focus lens), a reflection mirror 56 (first reflection mirror), a reflection mirror 57 (third reflection mirror), a reflection mirror 58 (second reflection mirror), and a reflection mirror 59 (fourth reflection mirror).

The scanning lens 53 is disposed on the optical path of the first light beam L1 between the polygon mirror 52 and the circumferential surface of the photoconductor drum 21Y, and focuses the first light beam L1 on the circumferential surface. In addition, the scanning lens 54 is disposed on the optical path of the second light beam L2 between the polygon mirror 52 and the circumferential surface of the photoconductor drum 21M, and focuses the second light beam L2 on the circumferential surface. In the present embodiment, the scanning lens 53 and the scanning lens 54 are each a single lens. In addition, the scanning lens 53 and the scanning lens 54 have the same shape and are arranged so as to be in point symmetry with respect to the rotation center of the polygon mirror 52, as shown in the cross section of FIG. 2. This makes it possible to commonalize the scanning lens 53 and the scanning lens 54, thereby the cost of the optical scanning device 23 is reduced.

In the present embodiment, the reflection mirror 56 and the reflection mirror 58 constitute the first mirror group of the present disclosure. The first mirror group is disposed on the optical path of the first light beam L1 between the scanning lens 53 and the circumferential surface of the photoconductor drum 21Y, and reflects the first light beam L1 to the circumferential surface. Similarly, the reflection mirror 57 and the reflection mirror 59 constitute the second mirror group of the present disclosure. The second mirror group is disposed on the optical path of the second light beam L2 between the scanning lens 54 and the circumferential surface of the photoconductor drum 21M, and reflects the second light beam L2 to the circumferential surface.

The reflection mirror 56 is disposed, among the first mirror group, closest to the scanning lens 53 on the optical path of the first light beam L1. The first light beam L1 having transmitted through the scanning lens 53 is incident on the reflection mirror 56. As shown in the cross section of FIG. 2, the reflection mirror 56 reflects the first light beam L1 downward away from the circumferential surface of the photoconductor drum 21Y. The reflection mirror 58 is disposed in the downstream of the reflection mirror 56 on the optical path of the first light beam L1. The reflection mirror 58 reflects the first light beam L1 reflected by the reflection mirror 56, to the circumferential surface of the photoconductor drum 21Y.

The reflection mirror 57 is disposed, among the second mirror group, closest to the scanning lens 54 on the optical path of the second light beam L2. The second light beam L2 having transmitted through the scanning lens 54 is incident on the reflection mirror 57. As shown in the cross section of FIG. 2, the reflection mirror 57 reflects the second light beam L2 upward in a direction of approaching the circumferential surface of the photoconductor drum 21M. The reflection mirror 59 is disposed in the downstream of the reflection mirror 57 on the optical path of the second light beam L2. The reflection mirror 59 reflects the second light beam L2 reflected by the reflection mirror 57, to the circumferential surface of the photoconductor drum 21M.

It is noted that, in the first housing 230A, dustproof glasses (not shown) are provided at the portions from which the first light beam L1 and the second light beam L2 are emitted. The dustproof glasses prevent foreign materials such as dust from entering the first housing 230A.

The scanning lens 53 and the scanning lens 54 (FIG. 3) of the present embodiment both have a free curved surface that is defined by the equation (1). In the equation (1), "z" represents a surface shape of the scanning lens 53 and the scanning lens 54 in the main scanning direction. Table 1 shows values of coefficients that can be substituted into the equation (1), for each of the incident surface and the emission surface. It is noted that although coefficients for the surface shape in the sub scanning direction are omitted, the sub scanning magnification between the polygon mirror 52 and the photoconductor drum 21Y (the photoconductor drum 21M) is set to three times or less. In particular, in the present embodiment, the length of the optical path from the polygon mirror 52 to the scanning lens 53 and the scanning lens 54 is set to be relatively long, and the length of the optical path from the scanning lens 53 and the scanning lens 54 to circumferential surfaces of the photoconductor drums 21Y and 21M is set to be relatively short. As a result, due to the scanning lens 53 and the scanning lens 54 each being a single lens, the sub scanning magnification is set to a small value.

Math. 1

$$z = \frac{r^2/R}{1 + \sqrt{1 - (1+k)(r/R)^2}} + \sum_{i=1} C_i r^i \quad (1)$$

In the equation (1),
"R" denotes a main scanning curvature radius,
"k" denotes a main scanning conic coefficient,
"Ci" denotes a coefficient of the surface shape, and
"r" denotes a height in a direction perpendicular to the optical axis direction.

TABLE 1

|    | Incident surface | Emission surface |
|----|------------------|------------------|
| R  | 22.114           | 21.537           |
| k  | −7.265           | −6.818           |
| C1 | 0                | 2.809E−03        |
| C2 | −1.949E−03       | −3.945E−03       |
| C3 | 0                | −2.384E−06       |
| C4 | −2.015E−06       | −1.660E−06       |
| C5 | 0                | 4.639E−10        |
| C6 | 4.123E−10        | 9.578E−11        |
| C7 | 0                | 0                |
| C8 | −3.186E−14       | −4.537E−14       |

The scanning lens 53 and the scanning lens 54 allow an excellent focus performance to be obtained when the distances from the emission surfaces of the lenses to the circumferential surfaces (scanned surfaces) of the photoconductor drums 21Y and 21M are each less than 110 mm. In addition, as shown in FIG. 3, the lens thickness (center thickness) of the scanning lens 53 and the scanning lens 54 is 9.0 mm. Furthermore, the distance from the deflection surface of the polygon mirror 52 to the incident surface of each lens is set to 23.7 mm.

As shown in FIG. 2, in the present embodiment, the polygon mirror 52 is arranged such that the rotation shaft thereof is inclined at a predetermined angle with respect to the first reference line DL that connects the rotation shafts centers of a pair of photoconductor drums 21 (photoconductor drums 21Y and 21M). The trajectory of the light beam deflected by the polygon mirror 52 is inclined at an acute angle θX with respect to the horizontal line (a straight line parallel to the first reference line DL). An optical path of the first light beam L1 is formed in rear of the polygon mirror 52, and an optical path of the second light beam L2 is formed in front of the polygon mirror 52. In this way, the first mirror group and the second mirror group are arranged such that the optical path of the first light beam L1 and the optical path of the second light beam L2 do not intersect with each other.

The rotation shaft of the polygon mirror 52 is inclined with respect to the up-down direction such that the front of the rotation shaft is located above, and the rear of the rotation shaft is located below. As a result, the first light beam L1 emitted from the light source 81 for yellow is deflected by the polygon mirror 52 in the rear diagonally upward direction toward the scanning lens 53 in a direction of approaching the first reference line DL. The first light beam L1 having transmitted through the scanning lens 53 is reflected by the reflection mirror 56 downward opposite to the first reference line DL. The reflection mirror 58, in the cross section shown in FIG. 2, reflects the first light beam L1 upward such that it passes through between the polygon mirror 52 and the scanning lens 53. Subsequently, the first light beam L1 is irradiated on the circumferential surface of the photoconductor drum 21Y. With such a configuration, even if a part of the first light beam L1 is reflected in a direction of separating away from the circumferential surface of the photoconductor drum 21Y, the optical path length of the first light beam L1 can easily be set to be the same as the optical path length of the second light beam L2. It is noted that an optical path of the first light beam L1 that travels from the polygon motor 51 to the scanning lens 53 is arranged to be shifted, in the left-right direction (a direction perpendicular to the plane of FIG. 2), from an optical path of the first light beam L1 that travels from the reflection mirror 58 to the circumferential surface of the photoconductor drum 21Y.

Similarly, the rotation shaft of the polygon mirror 52 is inclined with respect to the up-down direction such that the front of the rotation shaft is located above, and the rear of the rotation shaft is located below. As a result, the second light beam L2 emitted from the light source 82 for magenta is deflected by the polygon mirror 52 in the front diagonally downward direction toward the scanning lens 54, away from the first reference line DL. The second light beam L2 having transmitted through the scanning lens 54 is reflected by the reflection mirror 57 upward in a direction of approaching the first reference line DL. Subsequently, the second light beam L2 is reflected upward by the reflection mirror 59 and irradiated on the circumferential surface of the photoconductor drum 21M.

In order to obtain good focusing on the photoconductor drums 21Y and 21M, the optical path lengths of the first light beam L1 and the second light beam L2, in particular, the distance from the scanning lens 53 to the photoconductor drum 21Y and the distance from the scanning lens 54 to the photoconductor drum 21M, need to set to the same distance (length).

In conventional technologies, two laser beams deflected by the polygon mirror 52 are reflected by different mirrors and irradiated on the photoconductor drums. In order to ensure that each of the laser beams has a predetermined optical path length or more, the trajectories of the two laser beams reflected by the mirrors are arranged to intersect with each other above the polygon mirror 52 when viewed in a cross section taken along a plane including the sub scanning direction. This causes a problem that the height of the optical scanning device 23 is increased.

In the present embodiment, the light beams that have transmitted through the scanning lens 53 and the scanning lens 54 are reflected to be opposite to each other in the up-down direction. In addition, due to the configuration where the rotation shaft center of the polygon mirror 52 is inclined, even if the height of the first housing 230A is set to be low in the up-down direction, the optical path lengths of the first light beam L1 and the second light beam L2 can easily be set to the same length. In other words, it is possible to ensure that each of the first light beam L1 and the second light beam L2 has a predetermined optical path length or more, while restricting the height of the first housing 230A in the up-down direction to be low. In particular, compared to the other configuration where the optical paths of the first light beam L1 and the second light beam L2 are arranged to intersect with each other above the polygon mirror 52 in the cross section shown in FIG. 2, it is possible to reduce the height of the first optical scanning unit 23A in a direction (up-down direction) in which the light beam is irradiated on the scanned surfaces (the photoconductor drums 21Y and 21M), while setting the optical path lengths of the first light beam L1 and the second light beam L2 to be the same.

Suppose that the first light beam L1 reflected by the reflection mirror 56 passes through between the scanning lens 53 and the reflection mirror 56 and is irradiated on the photoconductor drum 21Y in FIG. 2, then the optical path length of the first light beam L1 is short. In the present embodiment, as described above, the optical path of the first light beam L1 reflected by the reflection mirror 58 is arranged by using the space between the polygon mirror 52 and the scanning lens 53. This makes it possible for the first light beam L1 to proceed to below the scanning lens 53, thereby the optical path length of the first light beam L1 is ensured. As a result, it is possible to set the optical path length of the first light beam L1 to be the same as that of the second light beam L2 that is deflected by the polygon mirror 52 in a direction of separating away from the first reference line DL. It is noted that the second optical scanning unit 23B, which has the same configuration as the first optical scanning unit 23A, produces the same act and effect as those described above.

Furthermore, in the cross section of FIG. 2, the reflection mirror 58 and the reflection mirror 59 cause the first light beam L1 and the second light beam L2 to be irradiated on the photoconductor drum 21Y and the photoconductor drum 21M along directions that intersect with each other at a predetermined angle with respect to the second reference line DR, respectively. With reference to FIG. 2, the incident angle θY of the first light beam L1 with respect to the second reference line DR is set to 10 degrees. As a result, compared to the case where the first light beam L1 is incident along the second reference line DR, the reflection light from the photoconductor drum 21Y is restricted. It is noted that this also applies to the incident angle of the second light beam L2.

In addition, as described above, when the scanning lens 53 and the scanning lens 54 are each a single lens, the sub scanning magnification between them tends to be small. Even in such a case, with the above-described configuration where a part of the first light beam L1 is reflected in a direction opposite to the photoconductor drum 21Y, the optical path length of the first light beam L1 is ensured. As a result, it is possible to focus the first light beam L1 on the circumferential surface of the photoconductor drum 21Y with a high accuracy.

Furthermore, in the present embodiment, as shown in FIG. 2, the outer appearances of the first housing 230A of the first optical scanning unit 23A and the second housing 230B of the second optical scanning unit 23B are each a parallelogram in a cross section. As a result, the housings of the first optical scanning unit 23A and the second optical scanning unit 23B can be commonalized. As shown in FIG. 2, the first housing 230A and the second housing 230B are disposed so as to overlap with each other in a direction perpendicular to the first reference line DL (a direction in which the second reference line DR extends, the up-down direction) when viewed in a cross section taken along a plane including the sub scanning direction. In FIG. 2, a second housing rear wall 230B1 of the second housing 230B is disposed above a first housing front wall 230A1 of the first housing 230A with a gap therebetween. In particular, in the present embodiment, the first mirror group and the second mirror group are disposed such that the reflection mirror 57 of the first optical scanning unit 23A and the reflection mirror 56 of the second optical scanning unit 23B overlap with each other in the direction perpendicular to the first reference line DL. With such a configuration where parts of adjacent housings are set to overlap with each other, the width of the optical scanning device 23 in the horizontal direction (the front-rear direction) can be reduced. As a result, the inter-axial distance between a plurality of photoconductor drums 21 that are disposed in alignment at predetermined intervals can be set to be small. In the present embodiment, by using the arrangement of the optical path of the second light beam L2 in the first optical scanning unit 23A and the optical path of the first light beam L1 in the second optical scanning unit 23B, the two housings can be arranged to overlap with each other as described above.

Up to now, an embodiment of the present disclosure has been described. With such a configuration, spaces in front and rear of the polygon mirror 52 can be used to form the optical paths of the first light beam L1 and the second light beam L2. The optical path of the first light beam L1 is arranged such that it once approaches, then separates away from, and then approaches again the circumferential surface of the photoconductor drum 21Y. This makes it possible to ensure the optical path length of the first light beam L1. On the other hand, the optical path of the second light beam L2 is arranged such that it once separates away from, and then approaches the circumferential surface of the photoconductor drum 21M. This makes it possible to reduce the height of the optical scanning device 23 in a direction in which the light beams are irradiated on the photoconductor drums 21, while setting the optical path lengths of the first light beam L1 and the second light beam L2 to be the same. It is noted that the present disclosure is not limited to the above-described configuration, but can be modified, for example, as follows.

(1) In the above-described embodiment, two housings are arranged to overlap with each other partially such that the reflection mirror 56 of the second optical scanning unit 23B is disposed above the reflection mirror 57 of the first optical scanning unit 23A. However, the present disclosure is not limited to this configuration. In a modified embodiment, the first mirror group and the second mirror group may be arranged such that, when viewed in a cross section taken along a plane including the sub scanning direction, the optical path of the second light beam L2 in the first optical scanning unit 23A overlaps with the optical path of the first light beam L1 in the second optical scanning unit 23B in a direction perpendicular to the first reference line DL. With this configuration, too, the two optical scanning units 23A and 23B installed in the image forming apparatus 1 are arranged to overlap with each other partially, thereby making it possible to reduce the height and the width in the sub scanning direction, of the image forming apparatus 1. As a result, the inter-axial distance between a plurality of photoconductor drums 21 can be set to be small.

(2) In the above-described embodiment, a plurality of photoconductor drums 21 are arranged above the optical scanning device 23. However, the present disclosure is not limited to this configuration. In another modified embodiment, the members shown in FIG. 2 may be reversed in the up-down direction such that the optical scanning device 23 is disposed above the plurality of photoconductor drums 21, and the exposure light is irradiated downward.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An optical scanning device comprising:
   a housing;
   a light source portion including a first light source and a second light source, the first light source emitting a first light beam, the second light source emitting a second light beam;
   a deflector whose rotation axis is inclined with respect to a first direction and a second direction, the first direction being opposite to the second direction, the deflector being configured to reflect the first light beam diagonally on a side of a third direction that is perpendicular to the first direction and the second direction, and on a side of the first direction, the deflector being configured to reflect the second light beam diagonally on a side of a fourth direction that is opposite to the third direction, and on a side of the second direction, such that the first light beam scans a first scanned surface and the second light beam scans a second scanned surface;
   a first focus lens disposed between the deflector and the first scanned surface and configured to focus the first light beam on the first scanned surface;
   a second focus lens disposed between the deflector and the second scanned surface and configured to focus the second light beam on the second scanned surface;
   a first mirror group disposed between the first focus lens and the first scanned surface and configured to reflect the first light beam to the first scanned surface; and
   a second mirror group disposed between the second focus lens and the second scanned surface and configured to reflect the second light beam to the second scanned surface, wherein
   the first mirror group includes:
      a first reflection mirror on which the first light beam that has transmitted through the first focus lens is incident, the first reflection mirror being configured to reflect the first light beam in the second direction of separating away from the first scanned surface; and
      a second reflection mirror configured to reflect the first light beam reflected by the first reflection mirror, toward the first scanned surface, and
   the second mirror group includes:
      a third reflection mirror on which the second light beam that has transmitted through the second focus lens is incident, the third reflection mirror being configured to reflect the second light beam in the first direction of approaching the second scanned surface; and
      a fourth reflection mirror configured to reflect the second light beam reflected by the third reflection mirror, toward the second scanned surface.

2. The optical scanning device according to claim 1, wherein
   the second reflection mirror reflects the first light beam such that the first light beam passes through between the deflector and the first focus lens.

3. The optical scanning device according to claim 1, wherein
   the first focus lens and the second focus lens have a same shape and are arranged so as to be in point symmetry with respect to a rotation center of the deflector.

4. An image forming apparatus comprising:
   a first photoconductor drum, a second photoconductor drum, a third photoconductor drum and a fourth photoconductor drum that are disposed in alignment at predetermined intervals; and
   the optical scanning device according to claim 1, wherein
   the optical scanning device includes:
      a first optical scanning unit configured to scan circumferential surfaces of the first photoconductor drum and the second photoconductor drum; and
      a second optical scanning unit configured to scan circumferential surfaces of the third photoconductor drum and the fourth photoconductor drum.

5. The image forming apparatus according to claim 4, wherein
   a first housing included in the first optical scanning unit and a second housing included in the second optical scanning unit are disposed so as to overlap with each other in the first direction and the second direction when viewed in a cross section taken along a plane including a sub scanning direction.

6. The image forming apparatus according to claim 4, wherein the first mirror group and the second mirror group are disposed such that, when viewed in a cross section taken along a plane including a sub scanning direction, the third reflection mirror in a first housing included in the first optical scanning unit and the second reflection mirror in a second housing included in the second optical scanning unit overlap with each other in the first direction and the second direction.

7. The image forming apparatus according to claim 4, wherein the first mirror group and the second mirror group are disposed such that, when viewed in a cross section taken along a plane including a sub scanning direction, an optical path of the second light beam in a first housing included in the first optical scanning unit and an optical path of the first light beam in a second housing included in the second optical scanning unit overlap with each other in the first direction and the second direction.

8. The image forming apparatus according to claim 4, wherein outer appearances of a first housing included in the first optical scanning unit and a second housing included in the second optical scanning unit are each a parallelogram when viewed in a cross section taken along a plane including a sub scanning direction.

\* \* \* \* \*